United States Patent [19]

Sato

[11] Patent Number: 4,857,917
[45] Date of Patent: * Aug. 15, 1989

[54] REMOTE CONTROL APPARATUS PROVIDING LEADER PULSE FOLLOWED BY DATA PULSES

[75] Inventor: Kazuo Sato, Iwanuma, Japan

[73] Assignee: Alps Electric Co., Ltd., Japan

[*] Notice: The portion of the term of this patent subsequent to Aug. 2, 2005 has been disclaimed.

[21] Appl. No.: 12,012

[22] Filed: Feb. 9, 1987

[30] Foreign Application Priority Data

May 16, 1986 [JP] Japan .................. 61-112145

[51] Int. Cl.4 .................................................. H04Q 7/00
[52] U.S. Cl. ..................... 340/825.570; 340/825.690; 455/343
[58] Field of Search ............... 340/825.57, 825.44, 340/825.72, 825.69; 455/343

[56] References Cited

U.S. PATENT DOCUMENTS

| 4,194,153 | 3/1980 | Masaki et al. ............ 340/825.44 |
| 4,506,386 | 3/1985 | Ichikawa et al. .......... 340/825.44 |
| 4,510,595 | 4/1985 | Glance et al. .................. 370/32 |
| 4,531,237 | 7/1985 | Bar-on et al. ................. 455/343 |
| 4,691,382 | 9/1987 | Nakajima .................. 340/825.44 |
| 4,761,830 | 8/1988 | Izumi ............................ 455/343 |

FOREIGN PATENT DOCUMENTS

| 0015202 | 2/1977 | Japan ............................ 455/343 |
| 0016513 | 2/1978 | Japan ............................ 455/343 |
| 0105632 | 6/1983 | Japan ............................ 455/343 |

*Primary Examiner*—Donald J. Yusko
*Assistant Examiner*—Edwin C. Holloway, III
*Attorney, Agent, or Firm*—Guy W. Shoup; Paul J. Winters; Brian D. Ogonowsky

[57] ABSTRACT

A communication apparatus is used in a radio control apparatus for remotely controlling the locking and unlocking of the doors or trunk of a vehicle and other uses. In this communication apparatus, a leader pulse having a predetermined duration is transmitted from the transmitter to the receiver prior to transmission of data. The receiver is intermittently operated for a period shorter than the duration of the leader pulse by periodic operating pulses issued for connecting its circuits to a battery power source, and detects the transmission of a leader pulse in order to hold the receiver in the operating condition for a predetermined period sufficient to receive the following data pulses.

1 Claim, 1 Drawing Sheet

REMOTE CONTROL APPARATUS PROVIDING LEADER PULSE FOLLOWED BY DATA PULSES

FIELD OF THE INVENTION

The present invention relates to a communication apparatus having a transmitter and a receiver which has realized low electrical power consumption in the receiver.

BACKGROUND OF THE INVENTION

A radio control apparatus has been used for remotely controlling locking or unlocking of the doors or trunk of a vehicle. This radio control apparatus comprises a transmitter carried by an operator and a receiver which is mounted in a vehicle and controlled by the transmitter. The receiver operates an actuator in accordance with the data transmitted from the transmitter, thereby realizing locking or unlocking of the doors or trunk of the vehicle through the remote control operation.

In such a radio control apparatus of the prior art, when data is transmitted from the transmitter the receiver is kept waiting in the operating condition for a long period of time. In this case, the receiver mounted in the vehicle is operated by the power source voltage of a car battery. Therefore, this radio control apparatus provides a problem that the receiver which is set to the operating condition for a long period of time consumes the electrical power of the car battery. Obtaining a low power consumption in the receiver has long been sought for such radio control apparatus.

SUMMARY OF THE INVENTION

The present invention has been proposed to correct the problem of such radio control apparatus of the prior art and therefore it is an object of the present invention to provide a communication apparatus which has a low power consumption by operating it periodically in the waiting condition for short periods of time.

In order to achieve such object, the communication apparatus of the present invention has a structure for transmitting a leader pulse which has a duration of a predetermined period prior to transmission of data from the transmitter, setting intermittently the receiver to an operating condition for a short period of time with an interval which is shorter than the duration of said leader pulse by a periodical operation control means, detecting transmission of said leader pulse by a detecting means during operation of the receiver, and setting said receiver to the operating condition for the predetermined period by an operation holding means when transmission of said leader pulse is detected by such detection means.

With such a structure, when the receiver is set intermittently to the operating condition for a short period of time by the periodical operation control means and the leader pulse which is transmitted from the transmitter is detected prior to the data by the detecting means during such operation, the receiver is operated for the predetermined period by the operation holding means. Thereby, the receiver in the waiting condition operates within a short period of time and consumes less electrical power. Upon detection of the leader pulse, the receiver is operated for the predetermined period in order to receive the data.

DETAILED DESCRIPTION OF THE INVENTION

A preferred embodiment of the present invention is explained in detail with reference to FIG. 1 and FIG. 2.

Figure 1A:
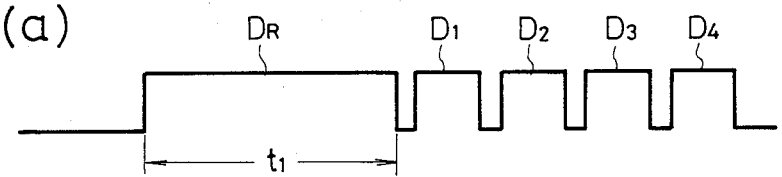
FIGS. 1 *a–c* are time charts for explaining operations of the communication apparatus of the present invention.
Figure 1B:
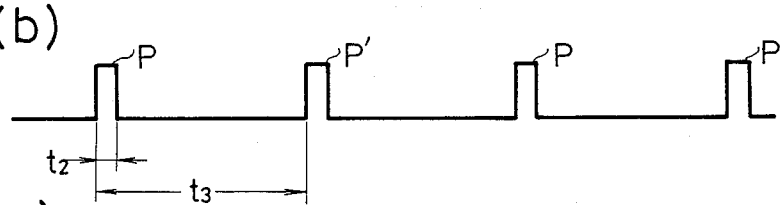
Figure 1C:
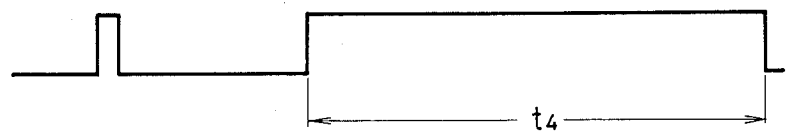
Figure 2:
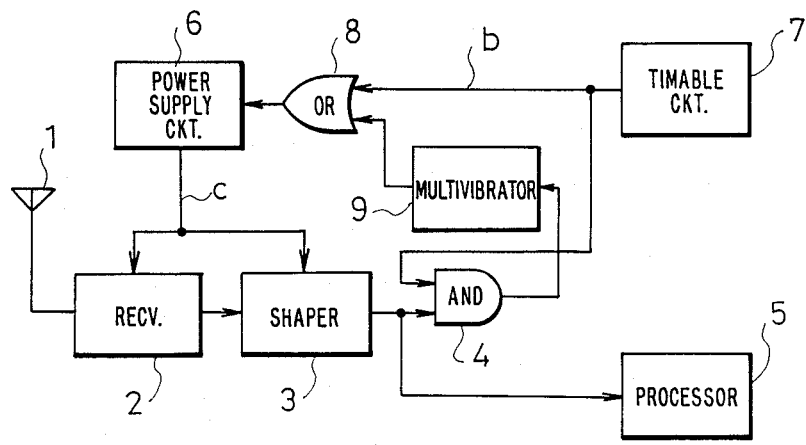
FIG. 2 is a block diagram of an embodiment of the receiver which forms the communication apparatus of the present invention.

In FIG. 1 and FIG. 2, the leader pulse $D_R$ is transmitted prior to data $D_1$–$D_4$ as shown in FIG. 1(*a*). This leader pulse $D_R$ has a predetermined duration $t_1$ which is longer than the transmission period of data $D_1$–$D_4$. As the data $D_1$–$D_4$, the data of the same content is repeatedly transmitted to ensure accurate reception by the receiver. As illustrated in FIG. 2, the receiver receives a transmitted signal with an antenna 1. This antenna input is then tuned and selected by a receiving circuit 2 and is applied to a pulse shaping circuit 3 and an output of this pulse shaping circuit 3 is applied to one input terminal of an AND circuit 4 and a data processing circuit 5. The receiving circuit 2 and pulse shaping circuit 3 are operated by the operation voltage supplied from a power supply circuit 6. Moreover, the receiver is provided with a timable circuit 7 and periodically outputs the pulse P spaced by the interval $t_3$ which is shorter than the predetermined duration $t_1$ of the leader pulse $D_R$ and bar a short pulse $t_2$ as shown in FIG. 1(*b*). The pulse P is applied to the other input terminal of the AND circuit 4 and the one input terminal of an OR circuit 8. An output of the AND circuit 4 is given to a trigger input terminal of a multivibrator 9 which outputs an output pulse of predetermined time $t_4$ which is sufficient for receiving the data $D_1$–$D_4$ and an output pulse of this multivibrator 9 is applied to the other input terminal of the OR circuit 8. With an output of this OR circuit 8, the power supply circuit 6 is intermittently controlled to supply the operation voltage to the receiving circuit 2 and the pulse shaping circuit 3. The power supply circuit 6 is, for example, formed with a car battery.

In such a structure, the power supply circuit 6 of the receiver is given the pulse P from the timable circuit 7 through the OR circuit 8 and thereby the receiver is set in the operating condition periodically when the operation voltage is supplied to the receiving circuit 2 and the pulse shaping circuit 3 from the power supply circuit 6, each time only for the period $t_2$ wherein the pulse P is output. During the period wherein the pulse P is not output, the receiver is in the not-operating condition. In case the leader pulse $D_R$ and the data $D_1$–$D_4$ are transmitted from the transmitter as illustrated in FIG. 1(*a*) under the waiting condition wherein the receiver is intermittently operated at intervals of $t_3$ which is shorter than the duration $t_1$ of the leader pulse $D_R$, the leader pulse $D_R$ is received by the receiving circuit 2 when it is operated by the pulse P′ output during transmission of the leader pulse $D_R$. The leader pulse is also applied to the one input terminal of the AND circuit 4 through the pulse shaping circuit 3. In this timing, and AND circuit 4 generates an output and triggers the multivibrator 9 with such output because the pulse P′ is supplied to the other input terminal of the AND circuit 4. The output pulse of this multivibrator 9 is applied to the power supply circuit 6 through the OR circuit 8.

The power supply circuit 6 continuously supplies the operation voltage to the receiving circuit 2 and pulse shaping circuit 3 during the predetermined period 4. The data $D_1$–$D_4$ are preferably processed in the data processing circuit 5 by continuous operation of this receiver and thereby locking or unlocking of the doors or trunk of the vehicle s performed.

In above embodiment, the timable circuit 7 is used as the periodical operation control means, while the AND circuit 4 is the detecting means and the multivbrator 9 is the operation holding means. But the present invention is not limited only to such structure and may have any type of structure when it has the same function. Moreover, the communication apparatus of the present invention has been explained in such a case where it is adapted to the radio control apparatus for remotely controlling the locking or unlocking of the doors or trunk of a vehicle, but it is not limited only to such use and it is of course possible to use the present invention in a transceiver and other apparatus such as a communication apparatus for emergency notification wherein a receiver is similarly to be set in a waiting condition for the transmission of a signal.

As described above, the communication apparatus of the present invention provides an excellent effect that the operating time in the waiting condition can be curtailed and power consumption of the receiver can be lowered because the receiver is operated intermittently for a short period of time.

What is claimed is:

1. In a communication apparatus in which a code signal is transmitted from a remote transmitter to a receiver which is powered by a battery power source, the improvement comprising:

said transmitter having means for transmitting a code signal composed of a leader pulse signal which is ON for a predetermined leader time period, followed by a series of data pulse signals during a predetermined data time period; and said receiver having:

a receiving circuit for receiving the transmitted code signal;

a power supply circuit for connecting and disconnecting said receiving circuit to/from the battery power source in accordance with an enabling pulse input, said receiving circuit being rendered operable when it is connected to said battery power source by said power supply circuit to receive the transmitted code signal and being non-operable so as not to consume power when it is disconnected from said power supply circuit;

a timable circuit for outputting a series of short enabling pulses of a short pulse duration and spaced apart at intervals longer than said short pulse duration and shorter than said leader time period;

a detector circuit, receiving said short enabling pulses from said timable circuit and an output of said receiving circuit, for detecting a synchronous occurrence of one of said short enabling pulses and the leader pulse signal received by said receiving circuit when it is rendered operable by said short enabling pulse, and for outputting a long enabling pulse of a duration greater than the time of said data pulse signals in said data time period following said leader time period, said detector circuit having an AND circuit receiving the output from said receiving circuit and said short enabling pulses from said timable circuit, and a multi-vibrator for providing said long enabling pulse output in response to a high output from said AND circuit; and an OR circuit for receiving as one input the short enabling pulses from said timable circuit and as another input the long enabling pulse from said detecting circuit and for providing an OR output based on said two inputs as said enabling pulse input to said power supply circuit, whereby said receiving circuit is rendered operable only intermittently for said short pulse period by said short enabling pulses to save power when it is in a waiting state and no code signal has been trasmitted, and operable for a duration longer than said data pulse signals in said data time period when a code signal has been transmitted and the leader pulse signal thereof has been detected by said detecting circuit.

* * * * *